United States Patent [19]

Shinozaki et al.

[11] Patent Number: 4,766,097

[45] Date of Patent: Aug. 23, 1988

[54] ALUMINUM NITRIDE-BASED SINTERED BODY OF HIGH THERMAL CONDUCTIVITY

[75] Inventors: Kazuo Shinozaki; Kazuo Anzai, both of Tokyo; Takeshi Takano, Kanagawa; Akihiko Tsuge, Yokohama, all of Japan

[73] Assignee: Kabushiki Kaisha Toshiba, Kawasaki, Japan

[21] Appl. No.: 51,237

[22] Filed: May 14, 1987

Related U.S. Application Data

[63] Continuation of Ser. No. 679,055, Dec. 6, 1984, abandoned.

[30] Foreign Application Priority Data

Dec. 12, 1983 [JP] Japan ............................ 58-233938

[51] Int. Cl.$^4$ ............................................ C04B 35/58
[52] U.S. Cl. ...................................... 501/98; 501/96; 501/152; 264/65; 264/66
[58] Field of Search ................. 501/98, 96, 152; 264/65, 66

[56] References Cited

U.S. PATENT DOCUMENTS

| | | | |
|---|---|---|---|
| 3,108,887 | 10/1963 | Lenie et al. | 501/98 |
| 3,833,389 | 9/1974 | Komeya et al. | 501/96 |
| 3,930,875 | 1/1976 | Ochiai et al. | 501/98 |
| 4,097,293 | 6/1978 | Komeya et al. | 501/98 |
| 4,203,733 | 5/1980 | Tanaka et al. | 501/98 |
| 4,478,785 | 10/1984 | Huseby et al. | 501/98 |
| 4,519,966 | 5/1985 | Aldinger et al. | 501/98 |
| 4,540,673 | 9/1985 | Takeda et al. | 501/98 |
| 4,547,471 | 10/1985 | Huseby et al. | 501/98 |
| 4,578,365 | 3/1986 | Huseby | 501/98 |
| 4,591,537 | 5/1986 | Aldinger et al. | 501/152 |
| 4,618,592 | 10/1986 | Kuramoto et al. | 501/96 |

FOREIGN PATENT DOCUMENTS

| | | |
|---|---|---|
| 0114193 | 8/1984 | European Pat. Off. |
| 0152545 | 8/1985 | European Pat. Off. |
| 3,247,985 | 7/1984 | Fed. Rep. of Germany |
| 47-18655 | 5/1972 | Japan |
| 47-018655 | 5/1972 | Japan |
| 58-171318 | 9/1983 | Japan |
| 58-176360 | 9/1983 | Japan |
| 60-071575 | 4/1985 | Japan |
| 60-065768 | 4/1985 | Japan |
| 60-180965 | 9/1985 | Japan |

OTHER PUBLICATIONS

Chemical Abstracts, vol. 99, No. 8, Aug. 22, 1983, publication date 8/31/83, abstract No. 57477j, Litvinenko, V. F. et al. "Thermophysical Properties of a Material Based on Aluminum Nitride and Yttrium Oxide".

Sakai et al., Chemical Abstracts, vol. 88, No. 26, Jun. 26, 1978, p. 319, No. 196289k.

Komeya et al., Journal of the British Ceramic Society, vol. 70, May 1971, No. 3, pp. 107–113.

Ryatsev et al., Chemical Abstracts, vol. 95, (1981), Abstract No. 11386t.

Schwetz, T. A. et al., "Sintering of Aluminum Nitride With Low Oxide Addition," Progress in Nitrogen Ceramics (1983), pp. 245–252.

Komeya, K. et al. "Effects of Various Additives on Sintering of Aluminum Nitride", Eng. translation of Yogyo-Kyokai-shi 89(6)—1981—pp. 330–334.

Litvinenko, V. F. et al., "Thermophysical Properties of Aluminum Nitride-Yttria Materials", translated from Poroshkovaya Metallurgiya No. 6 (246), pp. 77–79, Jun. 1983, pp. 490–492.

*Primary Examiner*—Steven Capella
*Assistant Examiner*—Ann M. Knab
*Attorney, Agent, or Firm*—Oblon, Fisher, Spivak, McClelland & Maier

[57] ABSTRACT

An aluminum nitride-based sintered body having a high thermal conductivity and a total oxygen content of 0.01 to 20% by weight which is prepared by mixing a main component of aluminum nitride powder containing 0.001 to 7% by weight of oxygen with 0.01 to 15% by weight of at least one of the group consisting of a powder of a rare earth element and/or a powder of a material containing the rare earth element (said 0.01 to 15% by weight being counted on the basis of the content of the rare earth element), and sintering said powder mixture.

4 Claims, No Drawings

ALUMINUM NITRIDE-BASED SINTERED BODY OF HIGH THERMAL CONDUCTIVITY

This application is a continuation of application Ser. No 06/679,055 filed on Dec. 6, 1984, now abandoned.

BACKGROUND OF THE INVENTION

This invention relates to an aluminum nitride-based sintered body with high thermal conductivity and, more particularly, to an aluminum nitride-based sintered body of high thermal conductivity adapted, for example, as a high heat dissipating substrate for a semiconductor device.

Aluminum nitride (AlN) has high mechanical strength in a wide temperature range and has excellent chemical stability. Therefore, the AlN has been applied as refractory material and can be applicable as a heat dissipating substrate for a semiconductor device by using its high thermal conductivity and high electric insulating property and so on. Since the AlN generally has no melting point and decomposes at a higher temperature than 2200° C., the AlN is normally used in the sintered form.

The AlN-based sintered body is commonly manufactured by the pressureless sintering method or hot pressing method. The pressureless sintering process comprises the steps of mixing the AlN raw powder with a sintering aid such as a rare earth compound, for example, yttrium, or a material containing a rare earth element such as yttrium oxide, molding the raw mixture, and finally sintering the molded body. However, the AlN-based sintered body manufactured by the above-mentioned conventional process has a lower thermal conductivity than the theoretical thermal conductivity (about 320 W/m·K) of AlN.

The hot pressing method to carried out by using the AlN powder alone or a raw material prepared by adding the above-mentioned sintering aid to the AlN powder. It is very difficult to manufacture a intricately shaped sintered body by said conventional hot pressing method. The thermal conductivities of an AlN-based sintered body obtained by both the atmospheric sintering method and the hot pressing method are still lower than the theoretical value.

SUMMARY OF THE INVENTION

The object of this invention is to provide an aluminum nitride-based sintered body with high density and high thermal conductivity.

To attain the above-mentioned object, this invention provides an aluminum nitride-based sintered body, with high thermal conductivity, which contains a total weight of 0.01 to 20% of oxygen. The sintered body is prepared by mixing aluminum nitride powder containing 0.001 to 7% by weight of oxygen with 0.01 to 15% by weight of at least one from the group consisting of a powder of a rare earth element, and that of a material containing the same rare earth element (said percentage being counted of the basis of the quantity of the rare earth element), and then sintering the powder mixture.

The high thermal conductivity of the AlN-based sintered body embodying this invention is supposedly derived from its specific structure as described below. The following description relates to the case where a rare earth oxide is used as a sintering aid.

When an oxygen-containing AlN-based material mixed with a powder of a rare earth oxide is molded and then sintered, the rare earth oxide reacts with the oxygen (normally present as aluminum oxide or aluminum hydroxide). As a result, a compound having a garnet structure (hereafter referred to as the "garnet phase"), which is expressed by a structural formula of $3Ln_2O_3 \cdot 5Al_2O_3$ (Ln: rare earth element), is created at three or more grain crossing parts of an AlN sintered body. Said garnet phase contributes to the sintering of the AlN particles and the fixation of oxygen. If the oxygen content of the AlN powder increases, then there remains some amount of oxygen which is not taken into the garnet phase. As a result, said remaining oxygen diffuses into the AlN particles in the form of a solid solution or a polytype compound. The thermal conductivity of the insulator is governed by the diffusion of phonon. Therefore, with an AlN-based sintered body containing the solid solution or the polytype compound, the phonon is scattered in said regions leading to a decrease in the thermal conductivity of the AlN-sintered body. In view of the above-mentioned drawback, the AlN-sintered body embodying this invention is characterized in that the oxygen content of the AlN powder is controlled to the aforementioned level of 0.001 to 7% by weight in proportion to the addition of the powder of a rare earth oxide, and chemically fixed with said oxygen content controlled to such a level as constitutes one component of aforesaid garnet phase. Therefore, the AlN-based sintered body of the invention offers the advantages that the diffusion of oxygen into the AlN particles is prevented, thereby minimizing the scattering of the phonon and improving the thermal conductivity of the subject AlN based sintered body.

It sometimes happens that a different compound phase having a perovskite structure (hereafter referred to as "the perovskite phase"), which has a structural formula of $LnAlO_3$ (Ln: rare earth element), from the aforementioned garnet phase is created. With respect to said perovskite phase, the AlN-based sintered body of this invention indicates the same behavior as in the case of the garnet phase.

As previously described, the oxygen contained in the AlN powder embodying this invention contributes to advance the sinterability of the AlN powder. The oxygen content of the AlN powder should be so controlled as to fall within the range of 0.001 to 7% by weight, preferably 0.05 to 4% by weight, or more preferably 0.1 to 3% by weight. The following is the reason why the oxygen content of the AlN powder is limited to the above-mentioned ranges. If the oxygen content falls below 0.001% by weight, the sinterability of the subject AlN-based sintered body is not sufficient, thereby presenting difficulties in manufacturing a high density AlN-based sintered body. Conversely, if the oxygen content rises above 7% by weight, then there remains some portions of oxygen which are not chemically fixed at three or more grain crossing parts of the AlN particles, or if a large amount of a rare earth oxide is added to the AlN-based sintered body, then the garnet phase produced in great quantities will cover the grain boundary of AlN grains, giving rise to a large amount of scattering of the phonon in that region. Therefore, when the oxygen content rises over 7% by weight, difficulties will be presented in manufacturing an AlN-based sintered body with high thermal conductivity.

The powder of a rare earth element, or a material containing the same rare earth element, acts as a sintering aid for the subject AlN-based sintered body. The rare earth elements include, for example, Y, La, Ce, Pr, Nd and Sm. Y is a particularly preferred rare earth element. Materials containing such a rare earth element include, for example, oxides, carbonates, and nitrates thereof. Most preferred among the rare earth-containing materials is yttrium oxide ($Y_2O_3$). For the object of this invention, it is possible to apply a powder of one rare earth element or rare earth-containing material or a powder of a mixture of two or more of them. The powder of such a rare earth element or rare earth-containing material should be added to the AlN powder at the rate of 0.01 to 20% by weight, preferably 0.14 to 11.3% by weight, or more preferably 0.28 to 8.5% by weight. The following is the reason why the addition of said rare earth or rare earth-containing material is limited to the above-mentioned extent. If the addition of said rare earth element, or a material containing a rare earth material, falls below 0.01% by weight, the sinterability of the subject AlN-based sintered body will not be sufficient, presenting difficulties in manufacturing an AlN-based sintered body with high density. Conversely, if the content of the rare earth element as a material containing a rare earth material increases over 20% by weight, the relative quantity of the AlN will decrease, reducing not only the thermal conductivity of AlN-based sintered body, but also its fundamental properties, of high refractoriness and mechanical strength. If any of the aforementioned rare earth elements is added to a powder of AlN, having a high total oxygen content, it is preferred to mix as large an amount of the rare earth element as can be controlled in order to fall within the aforesaid range of 0.01 to 20% by weight. When the AlN-base sintered body is manufactured by the pressureless sintering method, the content of said rare earth element should preferably be controlled to fall within a range of 0.1 to 15% by weight.

The reason why the total oxygen content of the AlN-based sintered body embodying this invention is limited to the aforementioned ranged is that if said total oxygen content decreases from 0.01% by weight, the sinterability of the AlN-based sintered body will be insufficient, presenting difficulties in obtaining an AlN-based sintered body with high density. Conversely, if said total oxygen content rises above 20% by weight, the grain boundaries of AlN grains are contaminated by the presence of unfixable oxygen, making it difficult to produce an AlN-based sintered body of high thermal conductivity. A description may now be made of the pressureless sintering method and hot press sintering method applied in the manufacture of the AlN-based sintered body of this invention. The pressureless sintering method comprises the steps of mixing AlN powder containing 0.001 to 7% by weight of oxygen with a prescribed amount of at least one selected from the group consisting of a powder of a rare earth element and/or a powder of a material containing the same rare earth element; blending the mixed mass, for example, in a ball mill, adding a binder to the blended mass; subjecting said blended mass to kneading, pelletization and control of the pellet sizes; molding the blended mass thus treated in a metal mold, or by means of a still water press or sheet molding; heating the molded mass at a temperature around 700° C. in streams of $N_2$ gas to remove the binder; and finally subjecting the molded mass to pressureless sintering in a graphite or AlN vessel at a temperature of 1550° to 1950° C. in an atmosphere of $N_2$ gas. During this pressureless sintering process, the aforesaid garnet phase or perovskite phase is created at a relatively low temperature of 1000° to 1300° C. while the temperature is stepped up. At a higher temperature of 1600° to 1950° C., the garnet phase or perovskite phases is melted, and liquid phase sintering occurs.

In the case of the hot press sintering, the raw material mixture is subjected to hot pressing at a temperature of 1550° to 1800° C.

DETAILED DESCRIPTION OF THE PREFERRED EMBODIMENT

This invention will become more apparent with reference to the following description of the preferred embodiment.

EXAMPLE 1

AlN powder having an average particle diameter of 1 micron and containing 3% by weight of oxygen was mixed with 3% by weight of samarium oxide powder having an average particle diameter of 1 micron. The raw material of the subject AlN-based sintered body was prepared by blending the above-mentioned mixture in a ball mill. The raw material was subjected to hot pressing for one hour in a carbon die having a diameter of 10 mm with a pressure of 300 kg/cm$^2$ and at a temperature of 1800° C., thereby manufacturing an AlN-based sintered body.

Control 1

Only AlN powder having an average particle diameter of 1 micron and containing 3% by weight of oxygen was used as the raw material of the AlN-based sintered body. The raw material was subjected to hot pressing under the same condition as applied in Example 1 to manufacture a AlN-based sintered body.

Control 2

3% by weight of samarium oxide powder having an average particle size of 1 micron was added to AlN powder having an average particle size of 1 micron and containing 20% by weight of oxygen. The mixture was blended in a ball mill to prepare the raw material of an AlN-based sintered body. The raw material was subjected to hot press sintering under the same condition as applied in Example 1 to produce an AlN-based sintered body.

The sintered bodies obtained in Example 1 and Controls 1 and 2 were thinned to a thickness of about 3.5 mm. The thermal conductivities of these sintered bodies were measured at room temperature by the laser flash method. The AlN-based sintered body of Example 1 indicated a thermal conductivity of 65 W/m·K. The AlN-based sintered body of Control 1 showed a thermal conductivity of 35 W/m·K. The AlN-based sintered body of Control 2 had a thermal conductivity of 32 W/m·K.

According to an X-ray diffraction phase determination, the AlN phase and the perovskite phase alone were detected in the AlN-based sintered body of Example 1. Control 1 indicated not only the AlN phase but also a great deal of aluminum oxynitride. Control 2 showed not only the AlN phase and perovskite phase but also a considerable amount of aluminum oxynitride.

EXAMPLE 2

The raw material of the AlN-based sintered body was prepared in substantially the same manner as in Example 1, except that the samarium oxide applied in Example 1 was replaced by gadolinium oxide ($Gd_2O_3$). The raw material was subjected to hot pressing to provide an AlN-based sintered body. The sintered body thus produced was ground to a thickness of about 3.5 mm. Later, the thermal conductivity of said sintered body was determined at room temperature by the laser flash method. Said sintered body indicated a high thermal conductivity of 80 W/m·K. The X-ray diffraction analysis showed that said sintered body was composed of the AlN phase and garnet phase alone.

EXAMPLES 3 TO 7

AlN powder having an average particle size of 0.9 microns and containing 3% by weight of oxygen was mixed with 0.1% by weight, 0.5% by weight, 1% by weight, 3% by weight and 5% by weight of yttrium oxide ($Y_2O_3$) powder having an average particle size of 1 micron. The respective mixtures were blended by a wet process in a ball mill, providing 5 kinds of powder mixture each having a weight of 200 g. Later, 7% by weight of paraffin was added to the respective powder mixtures. The blended masses were pelletized to provide 5 kinds of raw material for the subject AlN-based sintered body. The raw materials were subjected to cold molding with a pressure of 300 kg/cm², providing plate samples each measuring 37 mm × 37 mm × 6 mm. These plate samples were heated to 600° C. in an atmosphere of nitrogen gas, and then allowed to stand in tact for ten hours and later subjected to decreasing. The plate samples thus treated were placed in the AlN vessel and subjected to pressureless sintering for 2 hours at a temperature of 1800° C. in an atmosphere of nitrogen gas, manufacturing 5 kinds of AlN-based sintered bodies.

The density and thermal conductivity of the 5 kinds of AlN-based sintered bodies were determined in the same manner as in Example 1, the results being set forth in Table 1 below. Control 3 given in Table 1 below represents an AlN-based sintered body produced in substantially the same manner as in Example 3, except that the raw material was prepared by adding 7% by weight of paraffin to the AlN powder containing 3% by weight of oxygen but lacking yttrium oxide.

The X-ray phase determination was made of the AlN-based sintered bodies obtained in Examples 3 to 7. All the AlN-based sintered bodies indicated the AlN phase, the garnet phase and a small amount of the aluminum oxynitride phase. It was found that an AlN-based sintered body containing a larger amount of yttrium oxide ($Y_2O_3$) showed a smaller amount of the aluminum oxynitride phase and larger amount of the garnet phase.

EXAMPLES 8 to 12

As shown in Table 2 below, five kinds of powder mixtures were provided by adding different amounts of yttrium oxide powder having an average particle size of 1 micron to AlN powders having different average particle sizes and oxygen contents. The respective mixture were blended by a wet process in a ball mill, thus preparing 5 kinds of powder mixtures each weighing 200 grams. Thereafter, with 7% by weight of paraffin. The blended masses were pelletized to provide 5 kinds of raw materials for the AlN-based sintered body. These raw materials were subjected to cold molding with a pressure of 300 kg/cm², producing five plate samples each measuring 37 mm × 37 mm × 6 mm. The plate samples were heated up to 600° C. in an atmosphere of nitrogen gas, allowed to stand intact for 10 hours and later decreased. The plate samples were placed in an AlN vessel and subjected to pressureless sintering in an atmosphere of nitrogen gas at a temperature shown in Table 2, thereby manufacturing 5 kinds of AlN-based sintered bodies.

The density and thermal conductivity of the respective AlN-based sintered bodies were determined in the same manner as in Example 1, the results being set forth in Table 2 below. Control 4 given in Table 2 below represents an AlN-based sintered body manufactured in substantially the same manner as in Example 10, except that the raw material was prepared by adding 10% by weight of yttrium oxide powder to AlN powder containing 20% by weight of oxygen and having an average particle size of 0.9 microns.

TABLE 1

| | Composition of powder mixtures | | | | | Sintering conditions | | | |
|---|---|---|---|---|---|---|---|---|---|
| | AlN powder | | Powder of rare earth element oxide | | | | | | Thermal |
| | Average particle size (μm) | Oxygen content (wt %) | Kind | Average particle size (μm) | Amount added (wt %) | Temperature (°C.) | Time (hr) | Density (g/cm³) | conductivity (W/m · K) |
| Example 3 | 0.9 | 3 | $Y_2O_3$ | 1 | 0.1 | 1800 | 2 | 3.24 | 41 |
| Example 4 | " | " | " | " | 0.5 | " | " | 3.26 | 49 |
| Example 5 | " | " | " | " | 1.0 | " | " | 3.29 | 54 |
| Example 6 | " | " | " | " | 3.0 | " | " | 3.31 | 72 |
| Example 7 | " | " | " | " | 5.0 | " | " | 3.33 | 75 |
| Control 3 | " | " | — | — | — | " | " | 2.44 | 22 |

TABLE 2

| | Composition of powder mixtures | | | | | Sintering conditions | | | |
|---|---|---|---|---|---|---|---|---|---|
| | AlN powder | | Powder of rare earth element oxide | | | | | | Thermal |
| | Average particle size (μm) | Oxygen content (wt %) | Kind | Average particle size (μm) | Amount added (wt %) | Temperature (°C.) | Time (hr) | Density (g/cm³) | conductivity (W/m · K) |
| Example 8 | 0.6 | 0.3 | $Y_2O_3$ | 1 | 0.1 | 1800 | 3 | 3.26 | 115 |
| Example 9 | 0.8 | 0.6 | " | " | 1.5 | " | " | 3.28 | 135 |
| Example 10 | 1.0 | 1.0 | " | " | 3.0 | " | 1 | 3.30 | 110 |
| Example 11 | 1.0 | 3.0 | " | " | 5.0 | " | " | 3.34 | 80 |
| Example 12 | 0.9 | 5.0 | " | " | 10.0 | " | " | 3.45 | 70 |
| Control 4 | 0.9 | 20 | " | " | 10.0 | " | " | 3.49 | 45 |

A determination was made by X-ray diffraction of the structures of the AlN-based sintered bodies produced in Examples 8 to 12. The AlN-based sintered bodies of Examples 8 and 9 indicated a minute amount of the garnet phase and aluminum oxynitride phase. The AlN-based sintered bodies of Examples 10 to 12 showed the AlN phase, garnet phase and aluminum oxynitride phase. It was discovered with respect to the AlN-based sintered bodies of Examples 10 to 12 that the AlN powder of Example 12, which contained the largest amount of oxygen, showed the largest content of the garnet phase, and also the presence of a considerable amount of the aluminum oxynitride phase. In contrast, the AlN-based sintered body of Control 4 indicated the presence of a prominent amount of aluminum oxynitride.

EXAMPLES 13 to 19

As shown in Table 3 below, AlN powder containing 1% by weight of oxygen and having an average particle size of 1 micron and mixed with 3% by weight of $Gd_2O_3$, $Dy_2O_3$, $La_2O_3$, $Ce_2O_3$, $Pr_2O_3$, $Nd_2O_3$ and $Sm_2O_3$ all had an average particle size of 1 micron. The raw powder mixture thus prepared was blended by a wet process in a ball mill for 10 hours, thus providing various kinds of powder mixtures each weighing 200 g. 7% by weight of paraffin was added to each powder mixture. Thereafter the mass was pelletized, producing 7 kinds of raw materials for the AlN-based sintered body.

A determination was made of the density of all the AlN-based sintered bodies thus obtained and also of the thermal conductivity of said sintered bodies in the same manner as in Example 1.

density and extremely high thermal conductivity which can be effectively applied as a heat dissipating substrate for a semiconductor device.

What is claimed is:

1. A process for preparing an aluminum nitride-based sintered body having a high thermal conductivity and a total oxygen content within the range of 0.01 to 20% by weight which comprises mixing powder ceramic components consisting essentially of as the main component, aluminum nitride powder containing 0.001 to 1% by weight of diffusible oxygen, with a rare earth element compound selected from the group consisting of oxides and carbonates of a rare earth element selected from the group consisting of Y, La, Pr, Nd, Sm, Dy and Gd, said rare earth element compound being capable of chemically fixing such diffusible oxygen, to supply 0.01 to 15% by weight of rare earth element based on the aluminum nitride-based sintered body, and sintering said powder mixture in an inert environment at a temperature of 1550° to 1950° C. and at a pressure and under conditions maintaining the total oxygen content within the above range to obtain said sintered body and to chemically fix said diffusible oxygen, the amount of total oxygen content in the sintered body being that due to said diffusible oxygen and that supplied in combination form with said rare earth element by said rare earth element compound.

2. The process according to claim 1, wherein said rare earth element compound is an yttrium compound.

3. The process according to claim 1, wherein said rare earth element compound is yttrium oxide.

4. The process according to claim 1 wherein the sintering temperature is 1600° to 1800° C.

TABLE 3

| | Composition of powder mixtures | | | | | Sintering conditions | | | Thermal |
|---|---|---|---|---|---|---|---|---|---|
| | AlN powder | | Powder of rare earth element oxide | | | | | | |
| | Average particle size (μm) | Oxygen content (wt %) | Kind | Average particle size (μm) | Amount added (wt %) | Temperature (°C.) | Time (hr) | Density (g/cm³) | conductivity (W/m · K) |
| Example 13 | 1 | 1 | $Gd_2O_3$ | 1 | 3 | 1800 | 2 | 3.29 | 85 |
| Example 14 | " | " | $Dy_2O_3$ | " | " | " | " | 3.29 | 85 |
| Example 15 | " | " | $La_2O_3$ | " | " | " | " | 3.33 | 105 |
| Example 16 | " | " | $Ce_2O_3$ | " | " | " | " | 3.30 | 95 |
| Example 17 | " | " | $Pr_2O_3$ | " | " | " | " | 3.31 | 100 |
| Example 18 | " | " | $Nd_2O_3$ | " | " | " | " | 3.31 | 95 |
| Example 19 | " | " | $Sm_2O_3$ | " | " | " | " | 3.30 | 90 |

As mentioned above, this invention can provide an aluminum nitride-based sintered body having a full

* * * * *